(No Model.)
A. W. VON SCHMIDT.
ROTARY ENGINE.
No. 256,178. Patented Apr. 11, 1882.
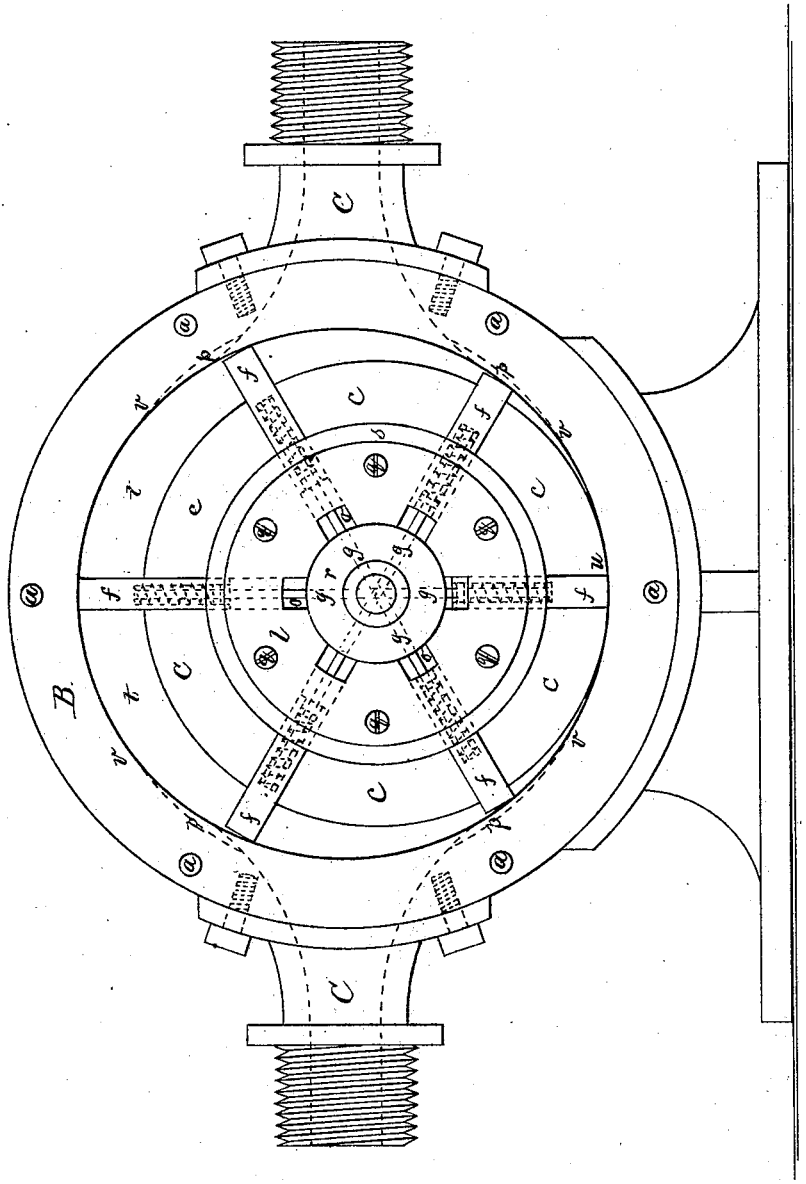

(No Model.)  3 Sheets—Sheet 2.
A. W. VON SCHMIDT.
ROTARY ENGINE.
No. 256,178.  Patented Apr. 11, 1882.
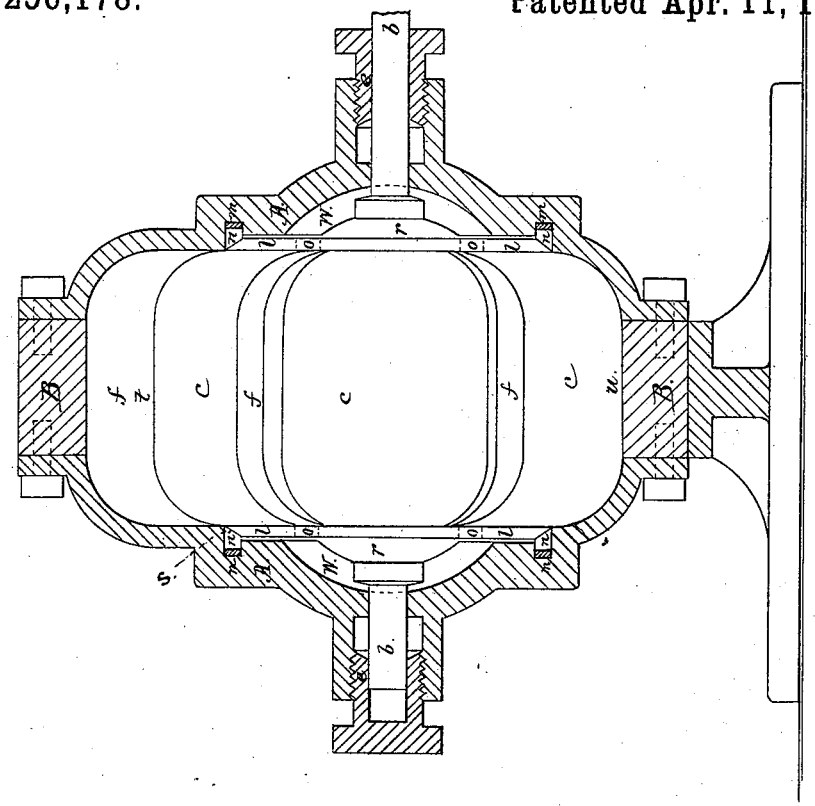
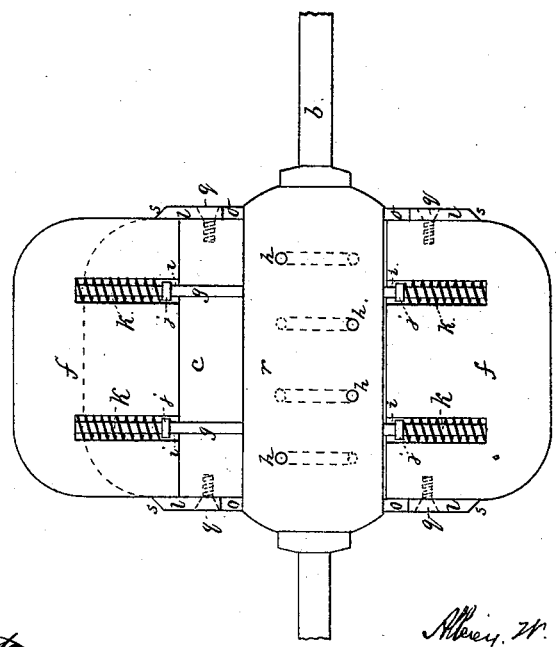
Attest:
G. W. Smith
H. W. Howard.
Inventor:
Alley. W. Von Schmidt
By atty Wm C. McIntire

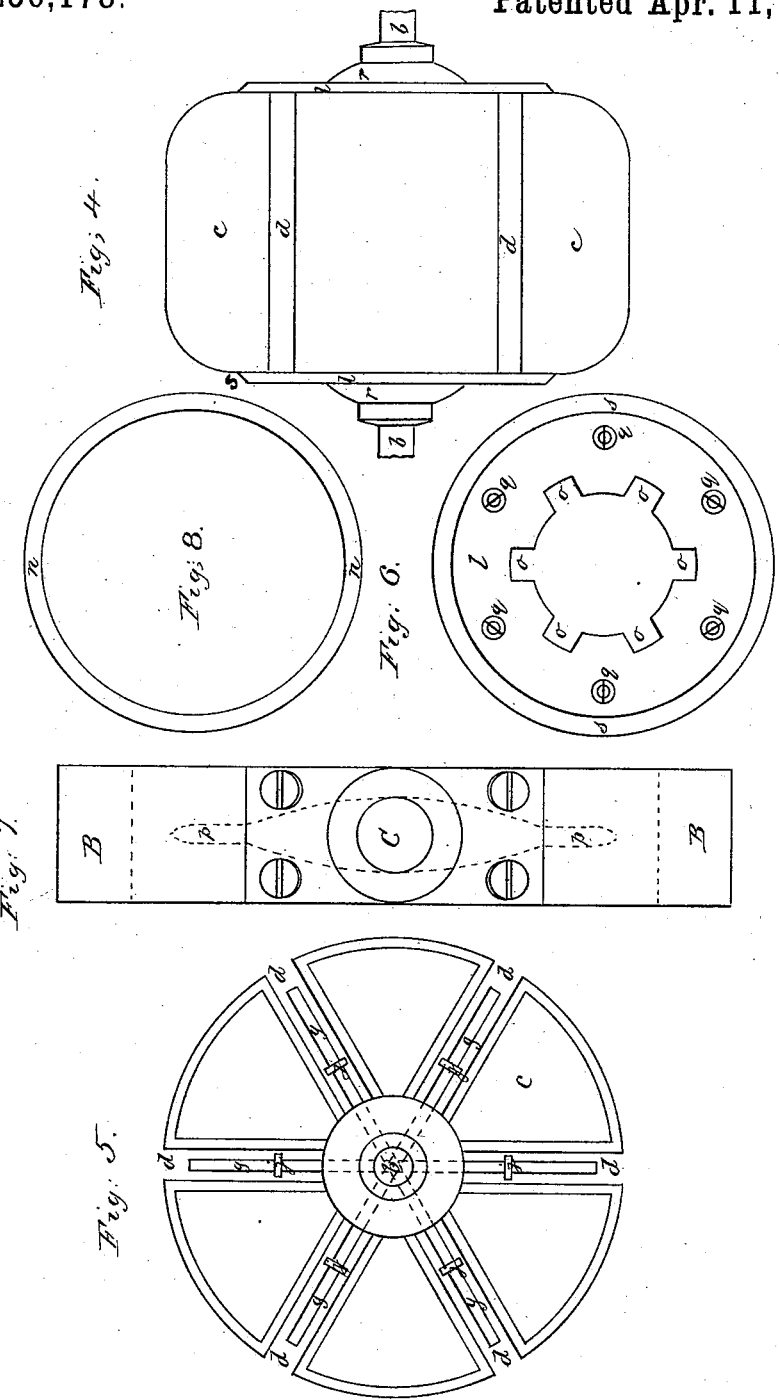

UNITED STATES PATENT OFFICE.

ALLEXEY W. VON SCHMIDT, OF SAN FRANCISCO, CALIFORNIA.

ROTARY ENGINE.

SPECIFICATION forming part of Letters Patent No. 256,178, dated April 11, 1882.

Application filed March 23, 1881. (No model.)

*To all whom it may concern:*

Be it known that I, ALLEXEY W. VON SCHMIDT, a citizen of the United States, residing at San Francisco, California, have invented new and useful Improvements in Rotary Engines, of which the following is a specification.

My invention has for its object the production of power by steam, water, or air, or the measuring, pumping, or forcing water, or the propelling of vessels without a dead point or center, and the manner of applying the power to the periphery of a wheel with self-acting valves at right angles to the axis and causing a continuous uniform rotary motion; and in the peculiar construction and arrangement of the parts, to be hereinafter explained.

To enable those skilled to make and use my improved rotary engine or machine, I will proceed to describe the construction and operation of the same, referring by letter to the accompanying drawings, in which—

Figure 1 is a longitudinal elevation. Fig. 2 is a longitudinal section of the same. Fig. 3 is a cross-section. Fig. 4 is a longitudinal view of the same with grooves for sliding valves and side plates. Fig. 5 is a side view of the runner, showing the slots in which the sliding valves or pistons play back and forth. Fig. 6 represents the side plates with openings for air, steam, or water discharges under the sliding valves or pistons. Fig. 7 represents the center ring or casing of the cylinder. Fig. 8 represents a packing-ring.

Similar letters indicate like parts in the several drawings.

The outside casing of the machine is made out of any kind of metal and of suitable thickness. It is cast in three parts, the two sides and the center piece of any required diameter. The sides and center piece are turned in a lathe to a true circle and nicely fitted together with screws or bolts, Figs. 1 and 2, letter *a*. Inside of this cylinder I place a runner of metal, Figs. 1, 2, 3, and 4, letter *c*, which is smaller than the case, running out of the center of the main case and running close to one side of it, leaving on the opposite side a space between the runner and the case for the purpose of steam, water, or air. This runner is divided into six equal parts, slotted, Figs. 1 and 5, letter *c*, in which six sliding valves or pistons operate in and out as the runner revolves in the main cylinder upon its axis. These valves or pistons are pushed from side to side by rods or springs. The steam, water, or air inlets are at opposite sides of the main cylinder, and the runner can be propelled in either direction by the application of power through these inlets.

Letter A, Figs. 1 and 2, represents the outside casing.

Letter B, Figs. 1, 2, and 7, represents the center piece of the main cylinder, which is turned straight on the face, while the sides of the main cylinder are turned to a quarter-circle, as represented in Fig. 2, letter A. This is done to avoid square corners in the cylinder, and to permit the easy packing of the sliding valves or pistons, Figs. 1, 2, 3, letter *f*.

Figs. 1, 2, 3, 4, 5 represent the runner and the manner of running it out of the center of the main cylinder of the main case, which is shown in Fig. 2, letter *e*. The stuffing-boxes are out of the center on the outside casing and corresponding to the center of the runner.

Figs. 1, 2, 3, letter *f* represents the valves in and partially out of the slots or grooves. The movement of these valves is caused by the rods and springs, as shown in Fig. 3, letters *g* and *k*.

The rods, letter *g*, Fig. 3, represent the manner in which they operate the valves by passing through holes drilled through the runner, letter *r*, from side to side. The valve or piston coming down on the circle of the cylinder pushes the rod *g* and spring *k* against the opposite valve or piston, forcing that out against the face of the main cylinder. Each valve or piston has two rods and springs to push it from one side to the other as they follow the curve of the main cylinder in making their revolutions. The rods have a collar near each end to support the spring, as shown in Fig. 3, letter *j*.

The valves or pistons, Fig. 3, letter *c*, represent holes bored into the inside portion of the valve or piston next the runner, to receive the ends of the rods *g* and springs *k*. The springs are for the purpose of giving elasticity to the valves or pistons in their movements.

The valves or pistons, Fig. 3, letter *f*, can be packed on their edges in any known manner to prevent leakage.

Figs. 1, 2, 3, 4, and 6, letter *l* represent plates of suitable thickness fastened by screws, letter $q$, to the main runner, having its upper edge beveled, letter $s$, to receive the packing-ring, Figs. 2 and 8, letter $n$. These plates, letter $l$, also serve as guides for the valves or pistons, letter $f$, in their movements. Openings are cut in these plates opposite each end of the valves or pistons to permit free ingress and egress of water from under the valves or pistons, letter $f$, when working, as represented in Figs. 1, 2, and 6, letter $o$. The water from under the valves or pistons passes into the channel, Fig. 2, letter $w$, to and fro, as required.

Fig. 2, letter $m$ represents the groove to receive the packing-ring resting on springs or rubber, and can be set up with screws, if required, against the plates, Figs. 1, 2, 3, 4, and 6, letter $l$.

Fig. 1, letter P represents a groove cut in the inside casing of the center piece of the main cylinder, to permit the free access of water to relieve the valve or piston after it has performed its functions. This groove commences at either inlet or outlet pipe, C, Figs. 1 and 7, and continues in both directions about one-sixth of the circumference of the inside casing, and terminates at letter $v$, where it runs out into the main circle of the cylinder.

Fig. 1, letter $t$ represents the space for the steam, water, and air to pass from the opening C to C, and over the runner $c$. Same figure, letter $u$, represents the close contact of the runner $c$ with the side of the main cylinder A, which represents also the manner in which the valves or pistons $f$ are drawn into the runner $c$, and the opposite valve or piston at the same time is forced into the space $t$, and so on, each valve or piston performing in the same manner as it makes its revolution.

The operation of the machine is continuous without a center or dead-point. When used as a power the water, steam, or air, being let in through the inlet C, forces against the valves or pistons $f$ while they are in the open space $t$, Fig. 1, causing the valves and runner to revolve. The action on the valves or pistons commences as soon as it passes the end of the small groove P, Fig. 1, letter $v$. Between the grooves P the water, steam, or air has full action on the valves or pistons. After the valve or piston arrives at the opposite groove, $p$, the pressure is taken off of that particular valve or piston, when similar action is had on the next one, and so on. The valve or piston that now passes on toward the portion of the cylinder where the runner and main cylinder come close together is being forced into the runner by the circle of the main cylinder, and by means of the rods and springs forces out the valves or pistons on its opposite side. At the same time what water there might be confined between the valves or pistons and the narrowing of the open space $t$ is let out through the little groove $p$ into the channel $c$, and in the same manner do all the valves operate.

The machine will work either way with the same facility. The only thing to be done in starting is to turn on the steam, water, or air into the machine, when it is immediately set in motion in either direction, as required.

Having described my invention, what I claim as new, and desire to secure by Letters Patent, is—

1. The cylinder B, formed with the grooves $p$, in combination with the side plates, $l$, and ring $n$, whereby steam, &c., is freely admitted and discharged, substantially as hereinbefore set forth.

2. In combination with the side plates, $l$, having a beveled edge, $s$, the bearing $m$, and packing-ring $n$, the plates serving also as guides for the sliding valves, as hereinbefore set forth.

In testimony whereof I have hereunto set my hand and seal in the presence of two subscribing witnesses.

ALLEXEY W. VON SCHMIDT. [L. S.]

Witnesses:
SAML. S. MURFEY,
J. H. GILMORE.